United States Patent
Rausch et al.

(10) Patent No.: US 9,628,955 B1
(45) Date of Patent: Apr. 18, 2017

(54) REPEATER CHAIN LOCATION DETERMINATION BASED ON A REPEATER CHAIN IDENTIFIER IN A WIRELESS COMMUNICATION NETWORK

(71) Applicant: Sprint Communications Company L.P., Overland Park, KS (US)

(72) Inventors: Walter F. Rausch, Shawnee, KS (US); William Manwaring, Chantilly, VA (US); Udit A. Thakore, Fairfax, VA (US); Yu Wang, Fairfax, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/233,484

(22) Filed: Aug. 10, 2016

(51) Int. Cl.
| | |
|---|---|
| *H04B 7/185* | (2006.01) |
| *H04W 4/02* | (2009.01) |
| *H04W 40/22* | (2009.01) |
| *H04H 20/02* | (2008.01) |
| *H04W 4/22* | (2009.01) |
| *H04L 5/00* | (2006.01) |
| *H04L 29/12* | (2006.01) |
| *H04W 48/16* | (2009.01) |
| *H04W 88/08* | (2009.01) |

(Continued)

(52) U.S. Cl.
CPC ............ *H04W 4/023* (2013.01); *H04H 20/02* (2013.01); *H04L 5/0051* (2013.01); *H04L 61/6068* (2013.01); *H04W 4/22* (2013.01); *H04W 40/22* (2013.01); *H04W 48/16* (2013.01); *H04B 7/155* (2013.01); *H04B 7/18513* (2013.01); *H04W 36/0016* (2013.01); *H04W 40/02* (2013.01); *H04W 84/047* (2013.01); *H04W 88/04* (2013.01); *H04W 88/08* (2013.01); *H04W 92/20* (2013.01)

(58) Field of Classification Search
CPC ... H04W 84/047; H04W 92/20; H04W 88/04; H04W 36/0016; H04W 40/02; H04W 40/22; H04W 16/26; H04W 88/08; H04W 24/10; H04W 4/023; H04W 20/02; H04W 48/16; H04W 4/22; H04B 7/155; H04B 7/15542; H04B 7/15557; H04B 7/15535; H04B 7/15507; H04B 7/1555; H04B 7/15; H04B 7/15592; H04L 5/0051; H04L 61/6068
USPC ................. 455/7, 421, 522, 10, 13.1, 404.2; 370/315, 252, 279, 312
See application file for complete search history.

(56) References Cited

U.S. PATENT DOCUMENTS

| | | |
|---|---|---|
| 6,501,955 B1 | 12/2002 | Durrant et al. |
| 6,839,539 B2 | 1/2005 | Durrant et al. |

(Continued)

*Primary Examiner* — Fred Casca

(57) ABSTRACT

A wireless communication network comprising a donor base station (BS) and a repeater chain wherein a location controller stores a repeater chain BS identifier (ID) associated with a repeater chain location. The donor BS broadcasts a BS ID and serves a repeater chain. The repeater chain broadcasts the donor BS ID and the repeater chain BS ID. The communication server system receives a location request for a User Equipment (UE) and establishes data connectivity between the UE and the location controller over the donor BS and the repeater chain. The UE transfers the repeater chain BS ID to the location controller, and the PDE translates the repeater chain BS ID to the repeater chain location and transfers the repeater chain location.

20 Claims, 7 Drawing Sheets

(51) Int. Cl.
*H04W 84/04* (2009.01)
*H04W 92/20* (2009.01)
*H04W 88/04* (2009.01)
*H04W 36/00* (2009.01)
*H04W 40/02* (2009.01)
*H04B 7/155* (2006.01)

(56) References Cited

U.S. PATENT DOCUMENTS

| | | |
|---|---|---|
| 8,897,813 B2 | 11/2014 | Hannan et al. |
| 8,965,324 B2 | 2/2015 | Albanes et al. |
| 9,173,131 B2 * | 10/2015 | Liu ........................ H04W 36/22 |
| 2003/0125045 A1 | 7/2003 | Riley et al. |
| 2006/0286961 A1 | 12/2006 | Levitan |
| 2009/0163171 A1 | 6/2009 | Sporel et al. |
| 2009/0163224 A1 | 6/2009 | Dean et al. |
| 2010/0048163 A1 | 2/2010 | Parr et al. |
| 2010/0093377 A1 | 4/2010 | Riley et al. |
| 2010/0291949 A1 | 11/2010 | Shapira et al. |
| 2011/0124347 A1 | 5/2011 | Chen et al. |
| 2013/0329629 A1 * | 12/2013 | Bao ................... H04W 36/0083 370/315 |

\* cited by examiner

US 9,628,955 B1

REPEATER CHAIN LOCATION DETERMINATION BASED ON A REPEATER CHAIN IDENTIFIER IN A WIRELESS COMMUNICATION NETWORK

TECHNICAL BACKGROUND

Wireless communication systems transfer data packets between User Equipment (UE) to provide data communication services, like internet access, media streaming, and user messaging. Wireless communication on systems allow users to move about and communicate over the air with access communication. Communication services include voice call, data exchange, web pages, streaming media, or text messages, among other communication services.

To expand or enhance the wireless signal coverage of a wireless communication network, such as in a Long Term Evolution (LTE) communication system, repeaters may be added to locations not adequately covered by current network infrastructure. A repeater transmits and receives wireless signals exchanged between wireless devices and a wireless network access point. Without the signal repetition provided by the wireless repeater, the coverage area of the wireless network access point may otherwise have not extended far enough to serve the wireless devices using the repeater. Thus, a wireless repeater provides a less resource intensive means for increasing wireless network coverage.

Location controllers provide location assistance data for UE. For example, when a wireless communication network receives a priority communication from a mobile device, such as an Emergency 911 (E911) call, the wireless communication network typically directs the priority communication to a communication server system to determine an appropriate Public Safety Answering Point (PSAP). A PSAP is a communication center used to answer incoming emergency calls, text messages, or other types of priority communications from mobile devices. In other examples, the wireless communication network may receive a location request for a UE. Location services for the UE and determination of an appropriate PSAP may be determined based on a donor base station identifier, such as a Pseudorandom Noise (PN) code, serving the mobile device. The UE location may be determined by querying a Position Determination Entity (PDE) or an enhanced Service Mobility Location Center (eSMLC) which associate donor base station identifiers with a donor base station latitude and longitude.

Once the connectivity between the UE and the location controller has been established, the location controller may then obtain additional location data to determine an initial position estimation of the mobile device, such as Global Positioning System (GPS) data. This initial position estimation of the mobile device may be calculated using the location of the donor base station and time delay values reported by the mobile device. The location controller may then use this calculated location approximation to generate GPS assistance data for the mobile device which is then transferred to the mobile device. The mobile device then typically responds to the GPS assistance data with a GPS measurement report from the mobile device.

If the GPS measurement report indicates a successful GPS estimation for the mobile device based on the GPS assistance data, the location controller derives a final fixed location estimation of the device. In other situations, the GPS measurement report may indicate that the initial position estimation for the mobile device was not successful in which case the GPS assistance data generated by the location controller is too inaccurate to enable the mobile device to rapidly locate the GPS satellites.

While location controllers are typically able to determine an accurate initial position estimation of the mobile device based on the donor base station location information associated with the donor base station identifier and the time delays reported by the mobile device, the initial position estimation of the mobile device may be improper when the mobile device is attached to a non-donor base station, such as a repeater attached to the donor base station. Since the time delays reported by the mobile device are impacted by being routed along a repeater chain, the location controller typically does not have accurate enough data to determine an initial position estimation of the mobile device. This results in the mobile device not being able to locate the appropriate satellites within a set time period. Unfortunately, current methods of determining accurate mobile device positions when the GPS assistant data fails are neither efficient nor effective for determining accurate location information for mobile devices using repeaters.

TECHNICAL OVERVIEW

A wireless communication network comprising a donor base station and a repeater chain wherein a location controller stores a repeater chain base station ID associated with a repeater chain location. The donor base station broadcasts a donor base station ID and serves a first repeater in the repeater chain. The first repeater broadcasts the donor base station ID and the repeater chain base station ID and serves a second repeater in the repeater chain. The second repeater broadcasts the donor base station ID and the repeater chain base station ID and serves a third repeater in the repeater chain. The third repeater broadcasts the donor base station ID and the repeater chain base station ID.

The communication server system receives a location request for a User Equipment (UE) and establishes data connectivity between the UE and the location controller over the donor base station and the repeater chain. The UE transfers the repeater chain base station ID to the location controller, and the location controller translates the repeater chain base station ID to the repeater chain location and transfers the repeater chain location.

DETAILED DESCRIPTION

Figure 1:
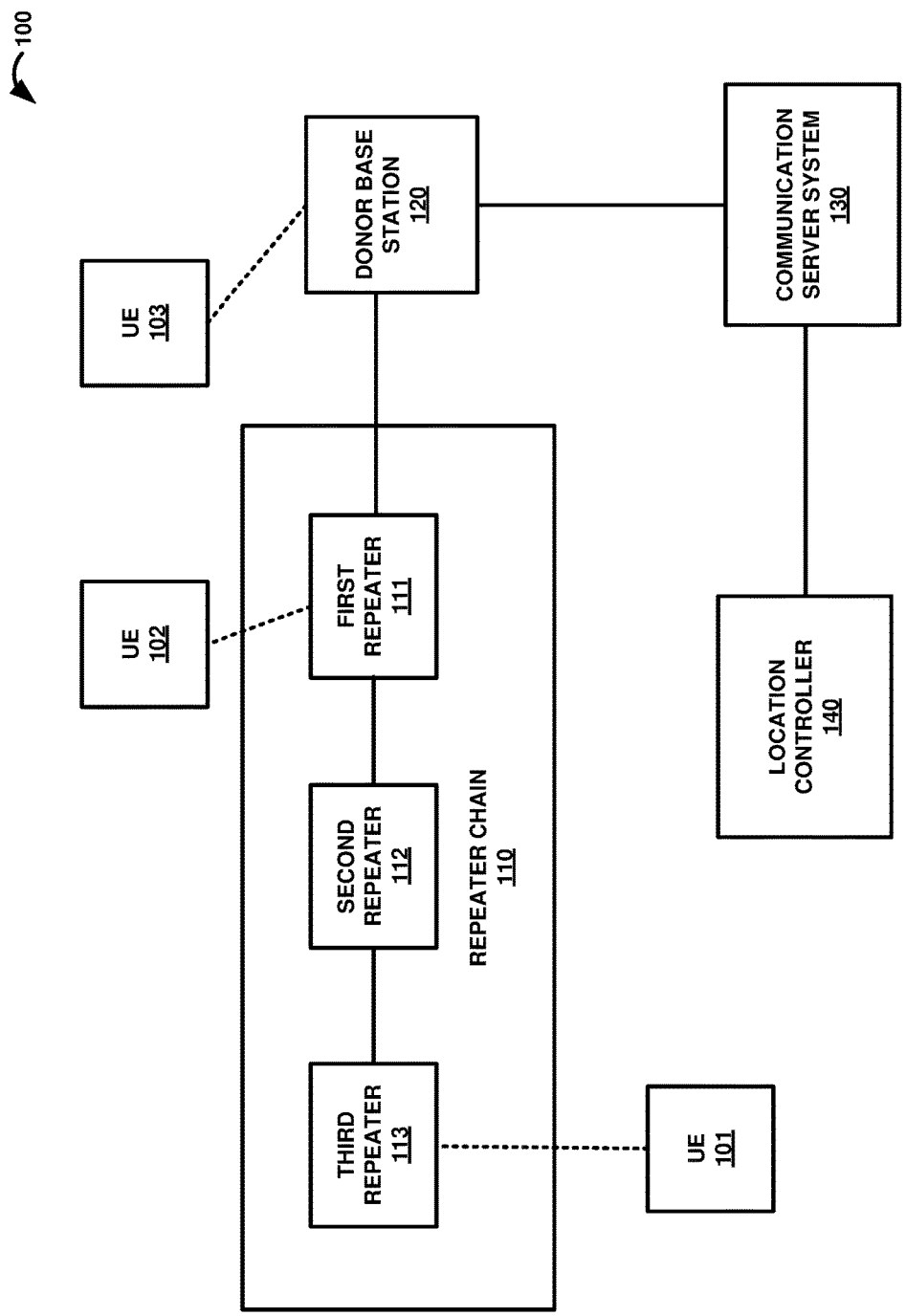
FIGS. 1-3 illustrate a communication system to determine a repeater chain location associated with a repeater chain identifier (ID) stored in a location controller.
Figure 2:
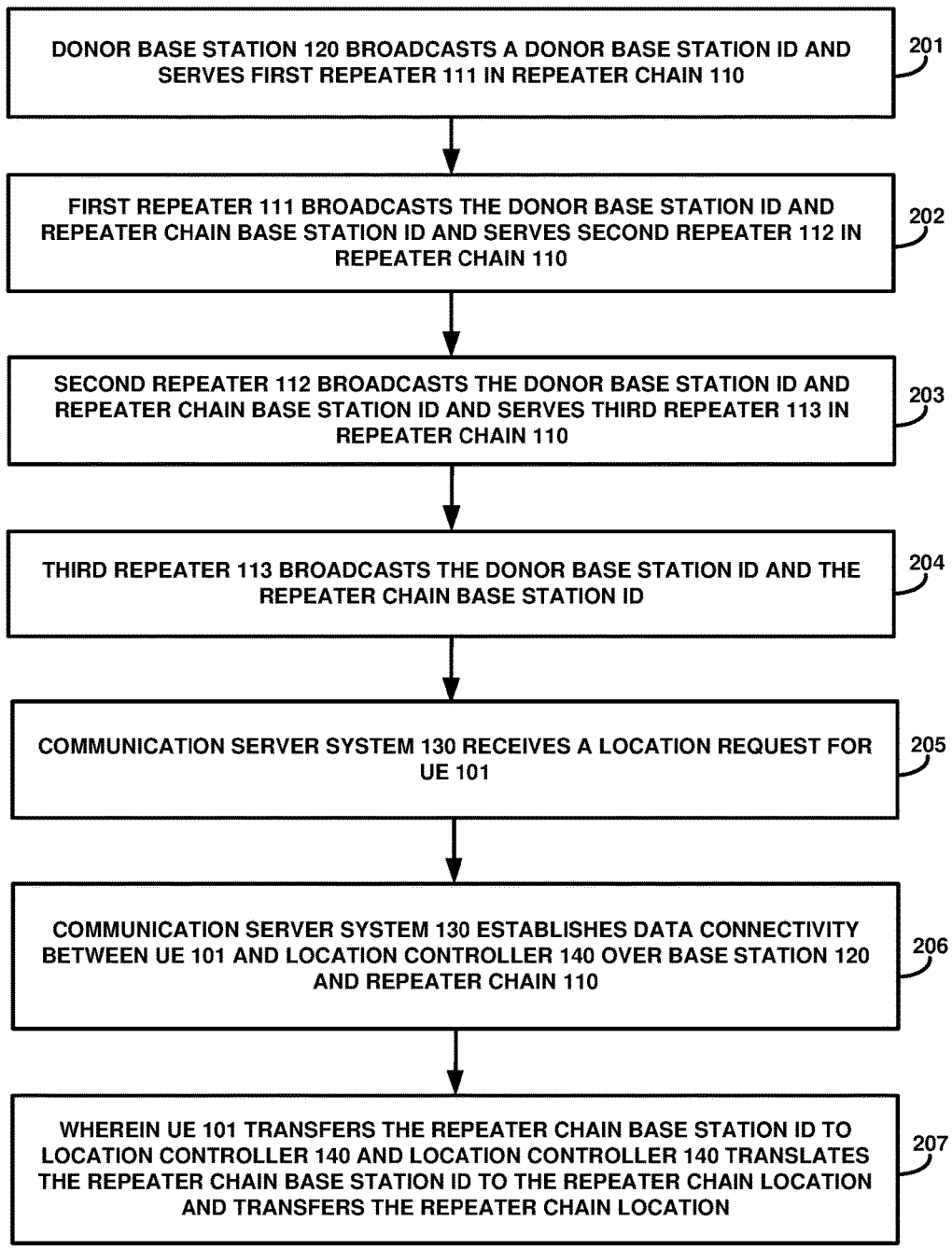
Figure 3:
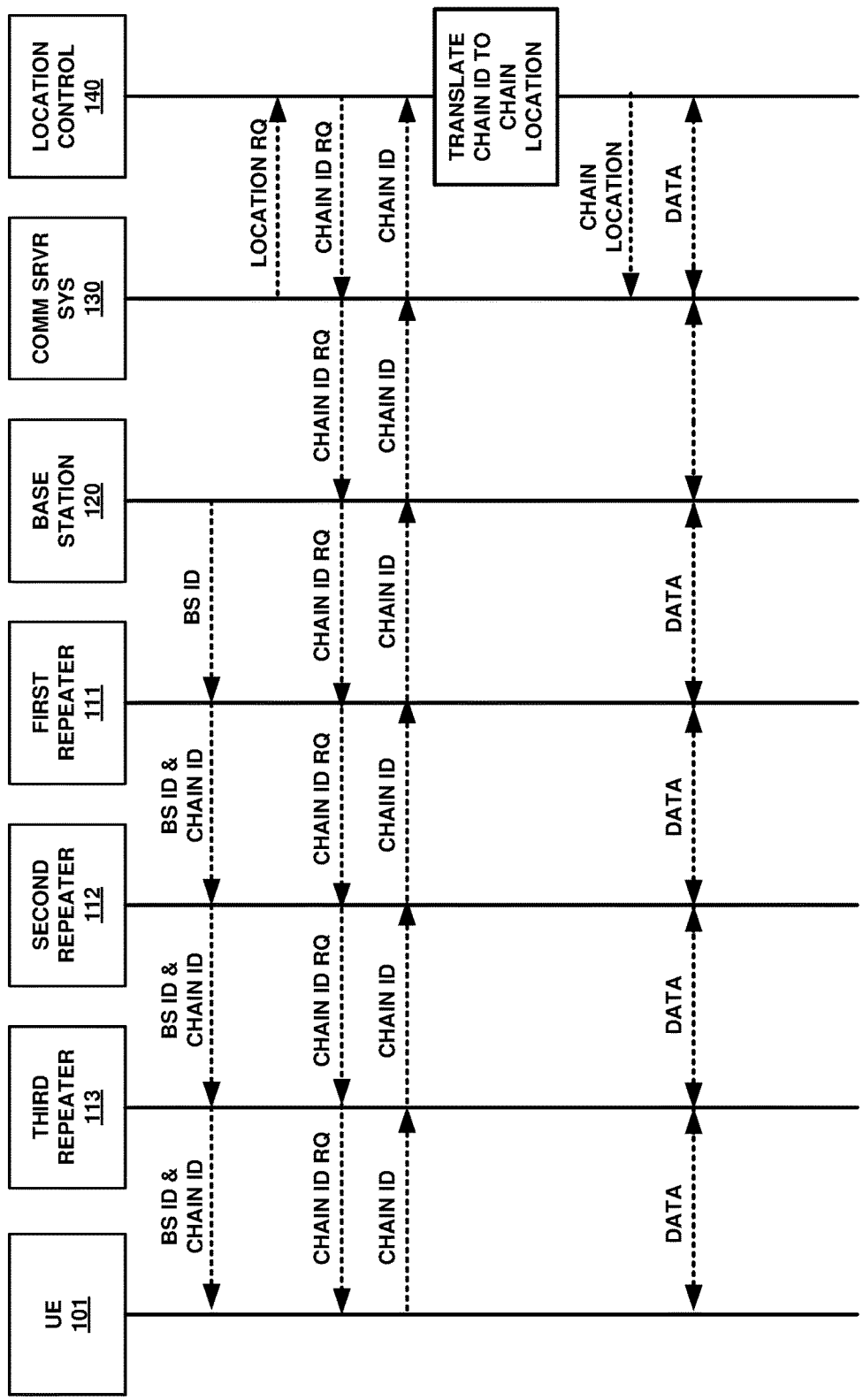

FIGS. 1-3 illustrate wireless communication system 100 to determine a repeater chain location associated with a repeater chain identifier (ID) stored in a location controller. Referring to FIG. 1, communication system 100 comprises UE 101, repeater chain 110, donor base station 120, communication server system 130, and location controller 140. Repeater chain 110 includes first repeater 111, second repeater 112, and third repeater 113. Wireless communication system 100 also includes wireless links illustrated by dotted lines and communication links illustrated by solid lines.

UEs 101-102 communicate with repeaters 111-113 in repeater chain 110 over wireless links. UE 103 communicates with donor base station 120 over a wireless link. Repeaters 111-113 in repeater chain 110 communicate with donor base station 120 over communication links. Donor base station 120 communicates with communication server system 130 over network elements in the wireless communication network and communication links. Communication server system 130 communicates with location controller 140 over a communication link.

In operation, donor base station 120 broadcasts a donor base station ID. Donor base station 120 may broadcast its base station ID to distinguish itself from other base stations and other sectors on the same base station. The donor base station ID may be broadcasted in a pilot signal and may include a code, such as Pseudorandom Number (PN) codes, Code Division Multiple Access (CDMA) spreading codes, or some other type of data stream transmitted by donor base station 120 to identify the base station and base station access data. Data broadcasted by donor base station 120 may include a mobile country code, mobile network code, channel bandwidth, channel scheduling sequences, and other access data used by devices to communicate with donor base station 120. The donor base station ID broadcasted by donor base station 120 is also typically stored in location controller 140 and is associated with a location of donor base station 120, such as latitude and longitude coordinates of donor base station 120 and any other base station broadcasting a donor base station ID.

Donor base station 120 also serves first repeater 111 in repeater chain 110. Repeater chain 110 allows expansion of coverage of the wireless communication network to locations not adequately covered by current network infrastructure. First repeater 111 transmits and receives wireless signals exchanged between donor base station 120 and repeaters 112-113 in repeater chain 110, as well as wireless signals from other mobile devices attached to first repeater 111, such as UE 102. Without the signal repetition provided by repeater chain 110, the coverage area of donor base station 120 may otherwise have not extended far enough to serve UEs 101-102. Thus, repeater chain 110 provides a less resource intensive means for increasing network coverage to mobile devices outside the donor base station 120 coverage area without the need for additional base stations.

Still referring to FIG. 1, first repeater 111 re-broadcasts the donor base station ID and broadcasts a repeater chain base station ID and serves second repeater 112 in repeater chain 110. The repeater chain base station ID may be broadcasted in a pilot signal and may include a code, such as a PN code, CDMA spreading code, or some other type of data stream transmitted by first repeater 111 in repeater chain 110 to identify the repeater and repeater access data. Similarly, second repeater 112 re-broadcasts the donor base station ID and the repeater chain base station ID and serves third repeater 113 in repeater chain 110. As the final repeater in the repeater chain, third repeater 113 re-broadcasts the donor base station ID and the repeater chain base station ID to UE 101.

It should be noted that the donor base station ID and the repeater chain base station ID may be broadcasted in separate pilot signals or as part of the code space shared in the pilot signal broadcasted by donor base station 120. For example, the donor base station ID may comprise a first PN pilot signal and the repeater chain base station ID may comprise a second PN pilot signal. In other examples, the donor base station ID may comprise a first PN code in a pilot signal and the repeater chain base station ID may comprise a second PN code that shares code space in the same pilot signal. In either scenario, the donor base station ID will be accompanied by the repeater chain base station ID.

In a next operation, communication server system 130 receives a location request for a UE, such as UE 101. In some examples, communication server system 130 comprises a Mobility Management Entity (MME). In other examples, communication server system 130 comprises an Internet Protocol (IP) Multimedia Subsystem (IMS), an IMS Location Routing Function (LRF), an IP circuit switch, or some other communication server system which enables wireless communication services between devices over various communication networks.

In some examples, the location request may be initiated by an external communication destination, such as a Public Safety Answering Point (PSAP) in response to receiving a priority communication request, such as an Emergency 911 call (E911). For example, the location request may be initiated in response to a priority communication request, such as a voice call, text message, or some other data exchange indicating priority communication services are required. In other examples, the location request may be initiated in response to receiving a Session Initiation Protocol (SIP) Invite associated with a high priority Quality-of-Service (QoS) Class Identifier (QCI).

Communication server system 130 also establishes data connectivity between UE 101 and location controller 140 over donor base station 120 and repeater chain 110. Communication server system 130 may establish data connectivity between UE 101 and location controller 140 by exchanging SIP Invite request and response messages and establishing one or more communication bearers between UE 101 and location controller 140 over donor base station 120, repeater chain 110, and other associated network elements, such as a Packet Data Gateway (P-GW) and a Serving Gateway (S-GW).

Location controller 140 may then request and receive the repeater chain base station ID from UE 101. In some examples, location controller 140 may re list of neighboring PNs from UE 101 and determine that UE 101 see the repeater chain base station ID at a high signal strength indicating to location controller 140 that UE 101 is likely exchanging signaling and data with donor base station 120 over repeater chain 110. Location controller 140 may comprise a database storing the repeater chain base station IDs in addition to donor base station IDs on a database, such as a PDE or an eSMLC.

In response to receiving the repeater chain base station ID from UE 101, location controller 140 may translate the repeater chain base station ID to determine location data associated with repeater chain 110 and transfer the location data associated with the repeater chain location. The location data associated with repeater chain 110 may be a geographic centroid of a geographic area occupied by repeater chain 110. In other examples, the location data associated with the repeater chain 110 may be a geographic location of one of the repeaters in a center of repeater chain 110, such as repeater chain 112. In other examples, the location data associated with the repeater chain base station ID may be a known offset of the location information associated with the donor base station ID.

FIG. 2 is a flow diagram illustrating an operation of wireless communication system 100 comprising a donor base station and a repeater chain wherein a location controller stores a repeater chain base station ID associated with a repeater chain location. In a first operation, donor base station 120 broadcasts (201) a donor base station ID and serves (201) first repeater 111 in repeater chain 110. First repeater 111 broadcasts (202) the donor base station ID and the repeater chain base station ID and serves (202) second repeater 112 in repeater chain 110. Second repeater 112 broadcasts (203) the donor base station ID and the repeater chain base station ID and serves (203) third repeater 113 in repeater chain 110. Third repeater 113 broadcasts (204) the donor base station ID and the repeater chain base station ID.

Still referring to FIG. 2, communication server system 130 receives (205) a location request for UE 101. Communication server system 130 establishes (206) data connectivity between UE 101 and location controller 140 over donor base station 120 and repeater chain 110. In a final operation, UE 101 transfers (207) the repeater chain base station ID to location controller 140 and location controller 140 translates (207) the repeater chain base station ID.

FIG. 3 is a sequence diagram illustrating the operation of wireless communication system 100 wherein a location controller stores a repeater chain base station ID associated with a repeater chain location. In operation, donor base station 120 broadcasts a donor base station ID. For example, donor base station 120 may broadcast a first PN pilot signal to UE 103 and first repeater 111 in repeater chain 110. First repeater 111 may then broadcast the donor base station ID and the repeater chain base station ID. First repeater 111 serves second repeater 112 in repeater chain 110. For example, first repeater 111 may broadcast the first PN pilot signal indicating the donor base station ID and a second PN pilot signal indicating the repeater chain base station ID to second repeater 112 in repeater chain 110 and any attached UEs, such as UE 102.

Similarly, second repeater 112 broadcasts the donor base station ID and the repeater chain base station ID and serves third repeater 113 in repeater chain 110. Third repeater 113 then broadcasts the donor base station ID and the repeater chain base station ID. For example, third repeater 113 broadcasts the first PN pilot signal indicating the donor base station ID and the second PN pilot signal indicating the repeater chain base station ID to UE 101.

Still referring to FIG. 3, communication server system 130 then receives a location request for UE 101. For example, UE 101 may initiate a SIP Invite indicating a communication request while attached to third repeater 113 in repeater chain 110. Repeater chain 110 then transfers the SIP Invite to communication server system 130 over donor base station 120. For example, in response to receiving the initiated SIP Invite from UE 101, third repeater 113 may then transfer the SIP Invite to donor base station 120 over second repeater 112 and first repeater 111 in repeater chain 110. Donor base station 120 may then transfer the SIP Invite to communication server system 130 over the associated network elements.

In response to receiving the location request, communication server system 130 establishes data connectivity between UE 101 and location controller 140 over donor base station 120 and repeater chain 110. For example, communication server system 130 may query an internal IMS LRF to select an appropriate priority communication destination and in response, transfer the SIP Invite to the selected priority communication destination. This connection between UE 101 and location controller 140 may then be used to exchange location information associated with repeater chain 110. In particular, communication server system 130 may transfer a location request to location controller 140. Location controller 140 may then transfer a location request to UE 101 requesting base station IDs, such as the PN codes, that UE 101 has found over donor base station 120 and repeater chain 110. UE 101 would then transfer the repeater chain base station ID to location controller 140 and location controller 140 would responsively translate the repeater chain base station ID to the location information associated with the repeater chain base station ID.

Once location controller 140 determines the location information associated with repeater chain 110, location controller 140 may transfer the location information. For example, location controller 140 may establish a connection with UE 101 over an established voice bearer, such as a QCI 1. During establishment of the QCI 1, location controller 140 may also receive the location information associated with repeater chain 110 to further assist in determining the location of UE 101.

Figure 4:
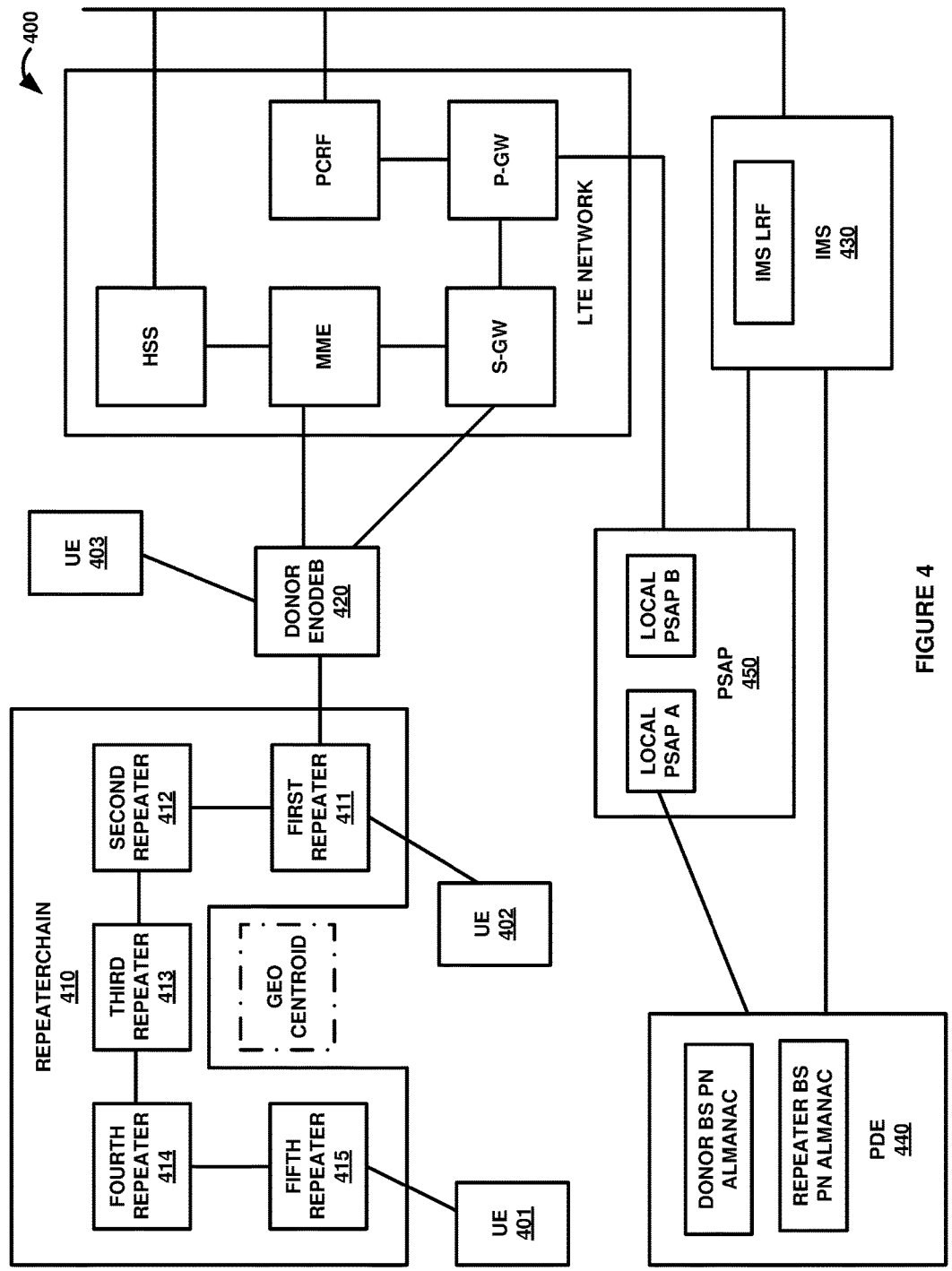
FIGS. 4-5 illustrate a Long Term Evolution (LTE) communication system to determine a repeater chain location associated with a repeater chain ID stored in a Position Determination Entity (PDE).
Figure 5:
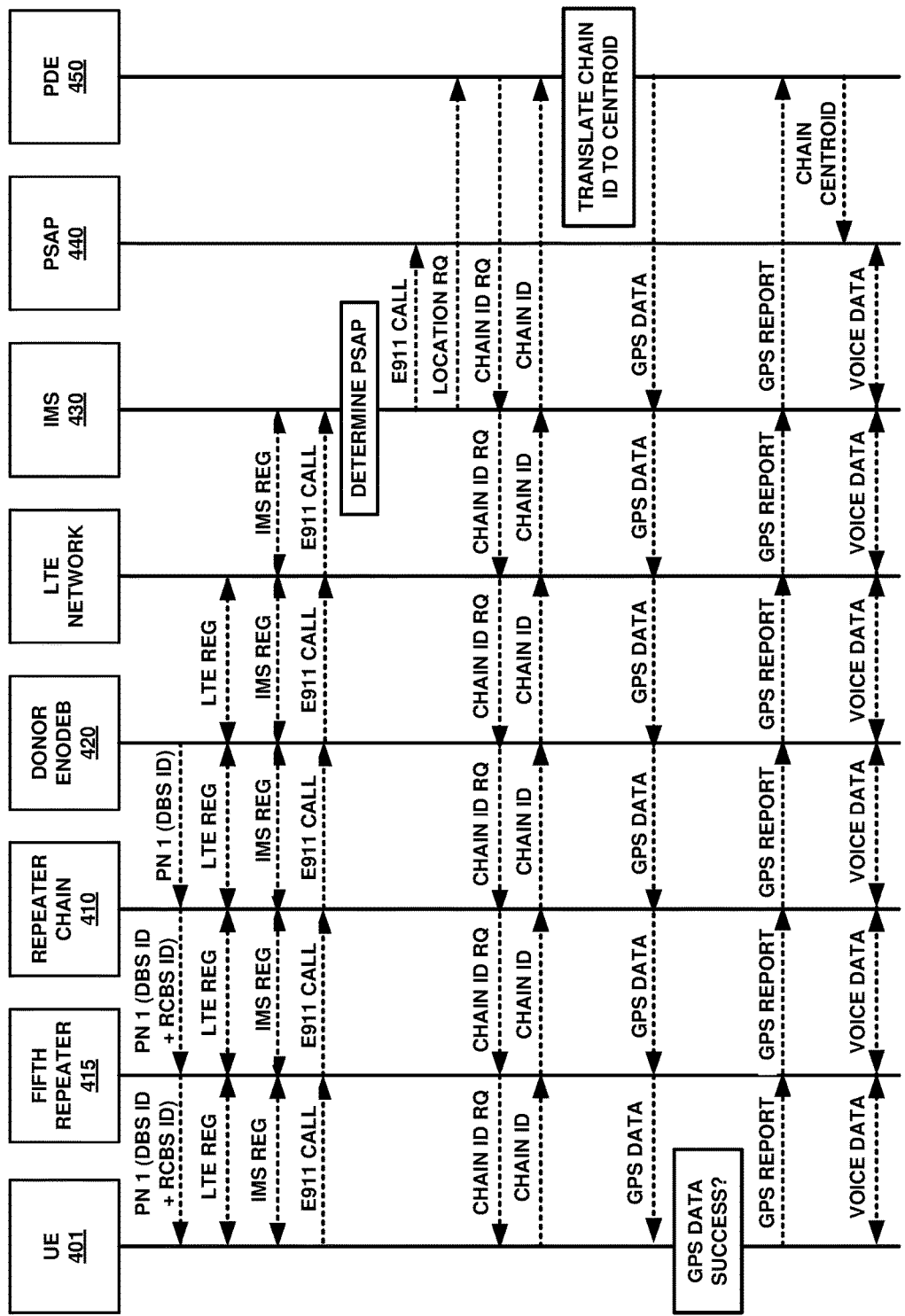

FIGS. 4-5 illustrate Long Term Evolution (LTE) communication system 400 to determine a repeater chain location associated with a repeater chain ID stored in a PDE. Referring to FIG. 4, LTE communication system 400 is an example of wireless communication system 100, although wireless communication system 100 may use alternative configurations and operations. LTE communication system 400 includes UEs 401-403, repeater chain 410, donor eNodeB 420, an LTE communication network, IMS 430, PDE 440, and Master PSAP 450. Repeater chain 410 includes first repeater 411, second repeater 412, third repeater 413, fourth repeater 414, and fifth repeater 415. The LTE communication network includes an MME, a Home Subscriber System (HSS), a Serving Gateway (S-GW), a Packet Data Network Gateway (P-GW), and a Policy and Charging Rules Function (PCRF). However, other LTE network elements may be included but are not shown for the sake of clarity.

IMS 430 contains an IMS LRF. Although not shown, IMS 430 may also include a Serving Call Session Control Function (S-CSCF), a Proxy CSCF (P-CSCF), an Interrogating CSCF (I-CSCF), an Emergency CSCF, (E-CSCF), a Telephony Application Server (TAS), and other IMS elements used to direct media services between devices. Master PSAP 450 contains multiple local PSAPs, such as local PSAP A and local PSAP B. PDE 440 contains both a donor base station PN almanac and a repeater chain base station PN almanac.

As shown in FIG. 4, UEs 401-403 exchange data and signaling with repeater chain 410 and donor eNodeB 420 over Radio Frequency (RF) links. Repeater chain 410 and donor eNodeB 420 exchange data and signaling over an X2 interface communication link. eNodeB 420 communicates with the MME in the LTE network over a S1-MME signaling link. Donor eNodeB 420 communicates with the S-GW in the LTE network over a S1-U data link. The MME and the HSS exchange data over a Diameter link. The S-GW and the P-GW communicate over an S5 or S8 data link. The P-GW and the PCRF exchange data over a Diameter link. The P-GW and PSAP 450 may exchange media over a data link, such as a QCI 1. The PCRF and the HSS may exchange data and signaling with IMS 430 over a Diameter link.

FIG. 5 illustrates a sequence diagram of LTE communication system 400 to determine a repeater chain location associated with a repeater chain ID stored in a PDE. In operation, eNodeB 420 broadcasts a first PN pilot signal identifying eNodeB 420 to first repeater 411 in repeater chain 410. First repeater 411 in repeater chain 410 then broadcasts the first PN pilot signal which identifies both donor eNodeB 420 and repeater chain 410 in the shared code space of the first PN pilot signal to second repeater 412 in repeater chain 410. Second repeater 412 broadcasts to third repeater 413 and so on until fifth repeater 415 broadcasts the first PN pilot signal containing the shared code space indicating both the donor base station ID and the repeater chain base station ID to UE 401.

UE 401 then attaches to fifth repeater 415 and registers with the LTE network over repeater chain 410 and donor eNodeB 420. In this example, UE 401 also registers with IMS 430 to exchange media signaling and data over repeater chain 410, donor eNodeB 420, and the LTE network. In a next operation, UE 401 initiates an E911 call which is transferred to IMS 430 over repeater chain 410, donor eNodeB 420, and the LTE network. In this example, UE 401 is already registered with IMS 430 and is not roaming. Therefore, UE 401 may automatically generate an E911 call. However, in other examples UE 401 may be required to perform an emergency registration with IMS 430 before generating the E911 call.

In a next operation, IMS 430 determines PSAP 450. PSAP 450 may be selected by an E-CSCF querying the LRF in IMS 430 using PN data for donor eNodeB 420. IMS 430 may then transfer the E911 call to PSAP 450 to initiate and establish a voice bearer between UE 401 and the associated local PSAP. In this example, PSAP 450 contains multiple local PSAPs and local PSAP A is selected by PSAP 450. Local PSAP A may be selected by PSAP 450 based on a calling capacity meeting required criteria and being closest to donor eNodeB 420.

IMS 430 also establishes connection between PDE 440 and UE 401 over the LTE network, donor eNodeB 420, and repeater chain 410 to determine GPS location information for UE 401. PDE 440 may receive a location request from IMS 430 and responsively transfer a repeater chain base station ID request to UE 401 over the LTE network, donor eNodeB 420, and repeater chain 410. UE 401 then transfers the first PN pilot signal code information identifying donor eNodeB 420 and repeater chain 410 to PDE 440. In this example, PDE 440 uses code information identifying repeater chain 410 in the code space of the PN pilot signal code to determine location information of UE 401. This may be stored in the repeater chain base station PN almanac in PDE 440. PDE 440 determines the location information associated with repeater chain 410 based on the geographic centroid of geographic area occupied by repeater chain 410.

PDE 440 then transfers the location information associated with repeater chain 410 to UE 401 in the GPS assistance data. In this example, UE 401 transfers a GPS measurement report to PDE 440 indicating that the GPS assistance data associated with repeater chain 410 was successful. In response to receiving the successful GPS measurement report, PDE 440 transfers the final location information associated with repeater chain 410 to PSAP 450. Advantageously, PDE 440 is able to determine a more accurate initial position estimation of UE 401 based on location information associated with repeater chain 410 than location information associated with donor eNodeB 420 since UE 401 likely would have reported time delays associated with being routed over repeater chain 410. In a final operation, a voice bearer between UE 401 and PSAP 450 is established.

Figure 6:
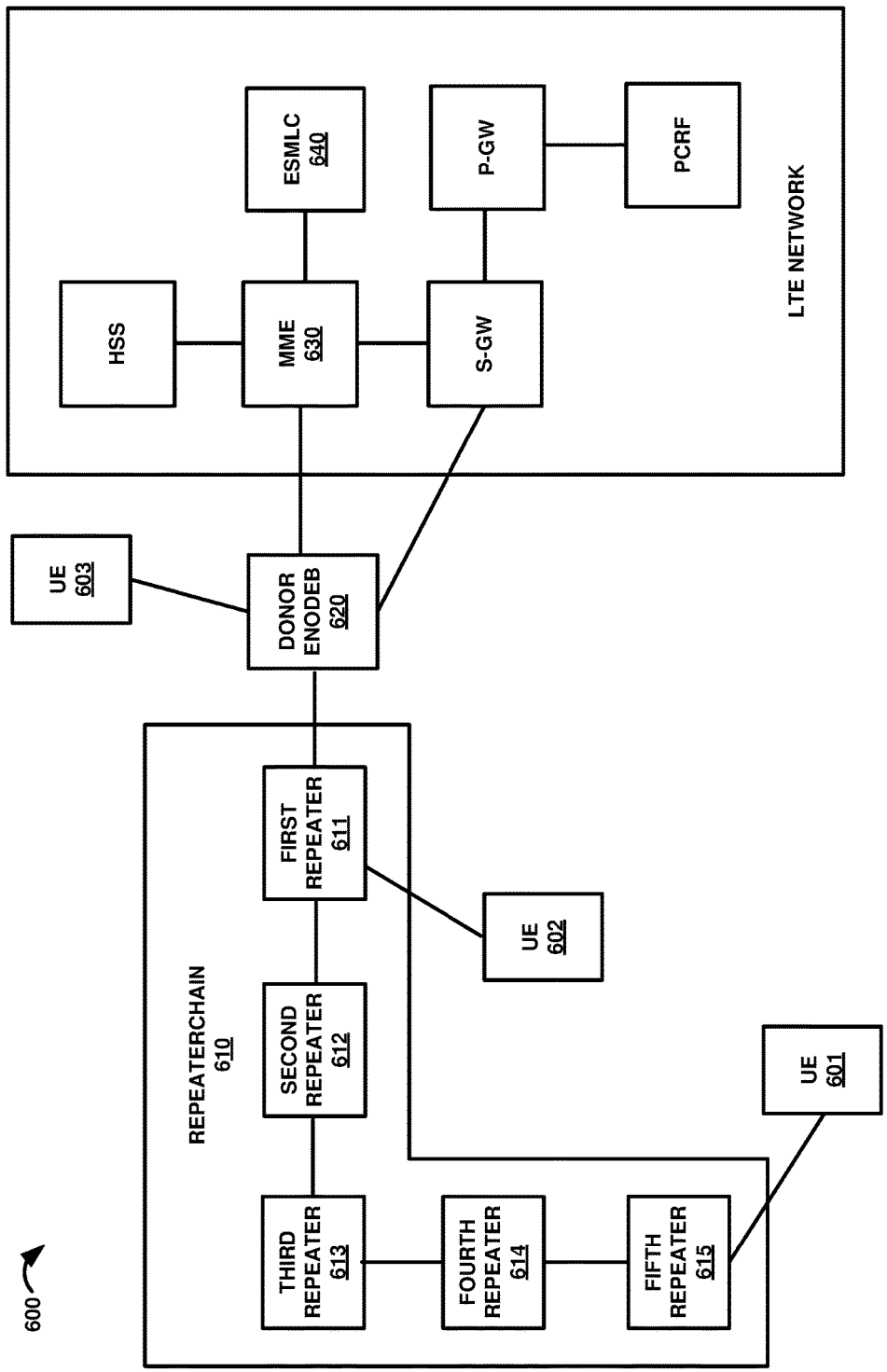
FIG. 6 illustrates an LTE communication system to determine a repeater chain location associated with a repeater chain ID stored in an enhanced Serving Mobile Location Center (eSMLC).

FIG. 6 illustrates an LTE communication system to determine a repeater chain location associated with a repeater chain ID stored in an eSMLC. LTE communication system 600 is an example of wireless communication system 100, although wireless communication system 100 may use alternative configurations and operations. LTE communication system 600 includes UEs 601-603, repeater chain 610, donor eNodeB 620 and an LTE communication network. The LTE network includes MME 630, eSMLC 440, an HSS, an S-GW, a P-GW, and a PCRF. However, other LTE network elements may be included but are not shown for the sake of clarity. Repeater chain 610 includes first repeater 611, second repeater 612, third repeater 613, fourth repeater 614, and fifth repeater 615.

UEs 601-603 exchange data and signaling with repeater chain 610 and donor eNodeB 620 over Radio Frequency (RF) links. Repeater chain 610 and donor eNodeB 620 exchange data and signaling over an X2 interface communication link. eNodeB 620 communicates with MME 630 in the LTE network over a S1-MME signaling link. Donor eNodeB 620 communicates with the S-GW in the LTE network over a S1-U data link. MME 630 exchanges data with and eSMLC 640 and the HSS over a Diameter link. The S-GW and the P-GW communicate over an S5 or S8 data link.

In operation, eNodeB 620 broadcasts a first PN pilot signal identifying eNodeB 620 to first repeater 611 in repeater chain 610. First repeater 611 in repeater chain 610 then broadcasts the first PN pilot signal which identifies both donor eNodeB 620 and repeater chain 610 in the shared code space of the first PN pilot signal to second repeater 612 in repeater chain 610. Second repeater 612 broadcasts to third repeater 613 and so on until fifth repeater 615 broadcasts the first PN pilot signal containing the shared code space indicating both the donor base station ID and the repeater chain base station ID to UE 601.

UE 601 then attaches to fifth repeater 615 and registers with the LTE network over repeater chain 610 and donor eNodeB 620. In this example, UE 601 also registers with MME 630 to exchange signaling and data over repeater chain 610 and donor eNodeB 620. In a next operation, UE 601 requests location information which is transferred to MME 630 over repeater chain 610 and donor eNodeB 620.

In a next operation, MME 630 receives the location request for UE 601 and establishes a connection between UE 601 and eSMLC 640 over the donor eNodeB 620 and repeater chain 610. eSMLC 640 then to receives the location request from MME 630 and responsively transfer a repeater chain base station ID request to UE 601 over the donor eNodeB 620 and repeater chain 610. UE 601 then transfers the first PN pilot signal code information identifying donor eNodeB 620 and repeater chain 610 to eSMLC 640. In this example, eSMLC 640 uses code information identifying repeater chain 610 in the code space of the PN pilot signal code to determine location information of UE 601. This may be stored in the repeater chain base station PN database in eSMLC 640.

eSMLC 640 determines the location information associated with repeater chain 610 based on the geographic location of one of the repeaters in a center of repeater chain 610, such as third repeater 613. eSMLC 640 then transfers the location information associated with repeater chain 610 to UE 601 in the GPS assistance data. In this example, UE 601 transfers a GPS measurement report to eSMLC 640 indicating that the GPS assistance data associated with repeater chain 610 was successful.

Figure 7:
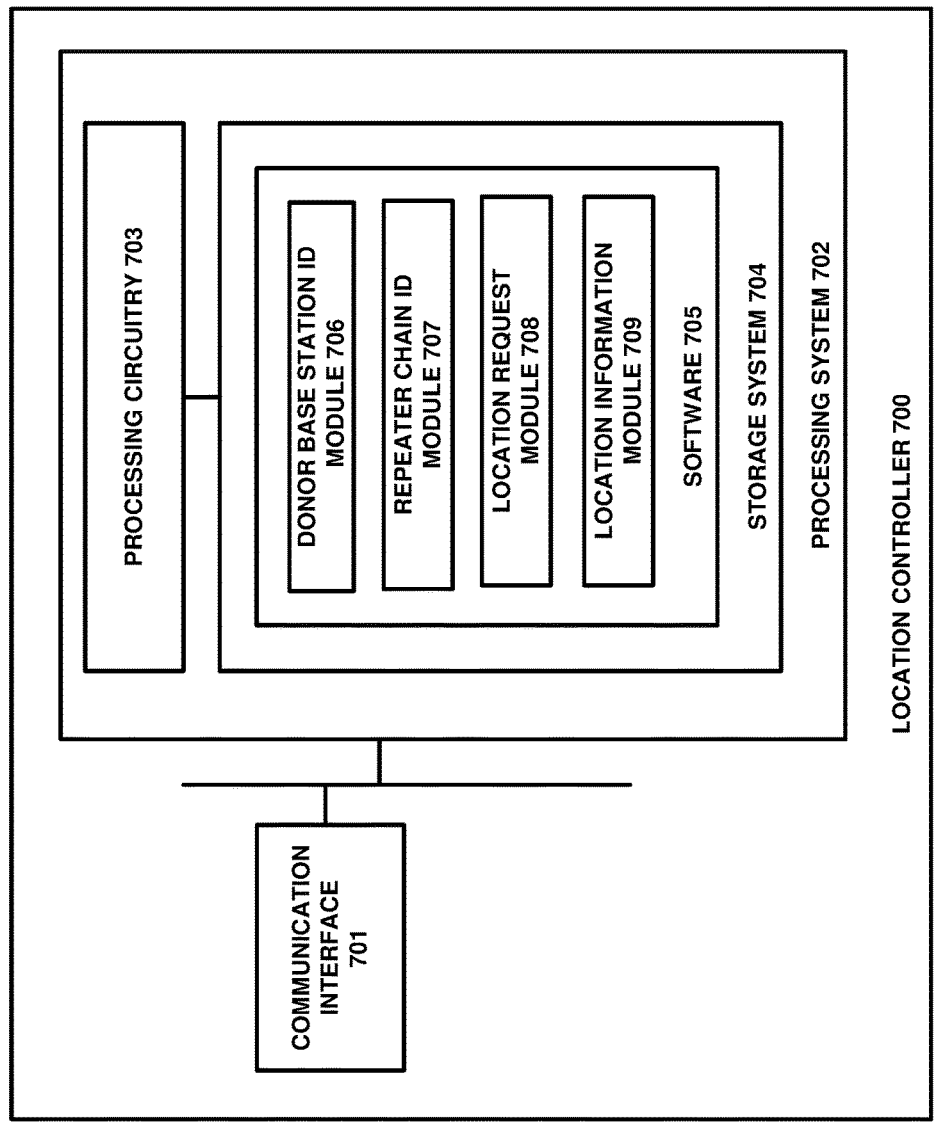
FIG. 7 illustrates a location controller to determine a repeater chain location associated with a repeater chain ID.

FIG. 7 illustrates location controller 700 to determine a repeater chain location associated with a repeater chain ID. Location controller 700 is an example of location controller 140, PDE 440, eSMLC 640 although location controller 140, PDE 440, and eSMLC 640 may use alternative configurations and operations. Location controller 700 includes communication interface 701 and data processing system 702. Data processing system 702 is linked to communication interface 701.

Communication interface 701 comprises communication components, such as antennas, ports, amplifiers, filters, modulators, signal processors, and the like. Communication interface 701 may be configured to communicate over metallic, wireless, optical links, or some other communication media material. Communication interface 701 may be configured to use Time Division Multiplex (TDM), Internet Protocol (IP), Ethernet, optical networking, wireless protocols, communication signaling, or some other communication format—including combinations thereof. In particular, communication interface 701 may be configured to exchange priority communication requests and location information with a communication server system, priority communication destination and a UE over associated network elements.

Data processing system 702 includes processing circuitry 703 and storage system 704 that stores software 705. Processing circuitry 703 comprises a microprocessor and other circuitry that retrieves and executes software 705 from storage system 704. Storage system 704 comprises a non-transitory storage medium, such as a disk drive, flash drive, data storage circuitry, or some other memory apparatus. Software 705 comprises computer programs, firmware, or some other form of machine-readable processing instructions. Software 705 may further include an operating system, utilities, drivers, network interfaces, applications, or some other type of software. When executed by processing circuitry 703, software 705 directs processing system 702 to operate location controller 700 as described herein.

In particular, when executed by processing circuitry 703, donor base station ID module 706 directs processing circuitry 704 to determine location information associated with a donor base station ID. When executed by processing circuitry 703, repeater chain ID module 707 directs processing circuitry 703 to determine location information associated with a repeater base station chain ID. When executed by processing circuitry 703, location request module 708 directs processing circuitry 703 to receive a location request for a UE over a communication server system and responsively request a repeater chain ID from the UE over a wireless network. When executed by processing circuitry 703, location information module 709 also directs processing circuitry 703 to transfer the location information for the UE.

Referring back to FIG. 1, UEs 101-103 could be a phone, tablet computer, media device, or some other apparatus having a wireless LTE transceiver. UEs 101-103 includes processing circuitry and memory that store and execute various software modules. UEs 101-103 comprises Radio Frequency (RF) circuitry which typically includes communication transceivers, such as antennas, ports, bus interfaces, signal processors, memory, and software. In particular, UE 101 may initiate and transfer priority communication requests to first repeater 111 and transfer the repeater chain base station ID to location controller 140 over repeater chain 110, donor base station 120, and other LTE network elements.

Repeaters 111-113 in repeater chain 110 and donor base station 120 each may include RF communication circuitry, communication interfaces, network interfaces, processing systems, computer systems, microprocessors, storage systems, storage media, or some other processing devices or software systems, and may be distributed among multiple devices. The RF communication circuitry typically includes an amplifier, filter, RF modulator, and signal processing circuitry. Repeaters 111-113 in repeater chain 110 and donor base station 120 may comprise a router, server, memory device, software, processing circuitry, cabling, power supply, network communication interface, structural support, or some other communication apparatus.

Communication server system 130 may include data service networks, such as the Internet, IMS, or some other network that provides data services to UEs 101-103. Communication server system 130 may comprise switches, wireless access nodes, Internet routers, network gateways, application servers, computer systems, communication links, or some other type of communication equipment—including combinations thereof.

The wireless links, indicated by the dotted lines, may use air, space, or some other wireless material that transports media. The wireless links may use protocols, such as LTE, Code Division Multiple Access (CDMA), Orthogonal Frequency Division Multiplexing Access (OFDMA), LTE Wireless Aggregation (LWA), Internet Protocol (IP), or some other wireless communication format—including combinations thereof.

The communication links, indicated by the solid lines, may use metal, glass, optics, air, space, or some other material as the transport media. The communication links may use Time Division Multiplexing (TDM), IP, Ethernet, Synchronous Optical Networking (SONET), communication signaling, wireless communications, or some other communication format—including improvements thereof. The communication links may be a direct link, or can include intermediate networks, systems, or devices, and can include a logical network link transported over multiple physical links.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a wireless communication network comprising a donor base station and a repeater chain wherein a location controller stores a repeater chain base station identifier (ID) associated with a repeater chain location, the method comprising:
   the donor base station broadcasting a donor base station ID and serving a first repeater in the repeater chain;
   the first repeater broadcasting the donor base station ID and the repeater chain base station ID and serving a second repeater in the repeater chain;
   the second repeater broadcasting the donor base station ID and the repeater chain base station ID and serving a third repeater in the repeater chain;
   the third repeater broadcasting the donor base station ID and the repeater chain base station ID;
   the communication server system receiving a location request for a User Equipment (UE) and establishing data connectivity between the UE and the location controller over the donor base station and the repeater chain; and wherein the UE transfers the repeater chain base station ID to the location controller, and the location controller translates the repeater chain base station ID to the repeater chain location and transfers the repeater chain location.

2. The method of claim 1 wherein the donor base station ID comprises a pseudo-random number pilot signal.

3. The method of claim 1 wherein the repeater chain base station ID comprises a pseudo-random number pilot signal.

4. The method of claim 1 wherein the donor base station ID comprises a first pseudo-random number pilot signal and the repeater chain base station ID comprises a second pseudo-random number pilot signal that shares code space with the first pseudo-random number pilot signal.

5. The method of claim 1 wherein the repeater chain location comprises a geographic centroid of a geographic area occupied by the repeater chain.

6. The method of claim 1 wherein the repeater chain location comprises a geographic location of one of the repeaters in a center of the repeater chain.

7. The method of claim 1 wherein the location controller comprises a Position Determination Entity (PDE).

8. The method of claim 1 wherein the location controller comprises an enhanced Serving Mobile Location Center (eSMLC).

9. The method of claim 1 wherein the communication server system comprises an Internet Protocol (IP) Multimedia Subsystem (IMS).

10. The method of claim 1 wherein the communication server system comprises a Mobility Management Entity (MME).

11. A wireless communication network comprising a donor base station and a repeater chain wherein a location controller stores a repeater chain base station identifier (ID) associated with a repeater chain location, the wireless communication network comprising:
    the donor base station configured to broadcast a donor base station ID and to serve a first repeater in the repeater chain;
    the first repeater configured to broadcast the donor base station ID and the repeater chain base station ID and to serve a second repeater in the repeater chain;
    the second repeater configured to broadcast the donor base station ID and the repeater chain base station ID and to serve a third repeater in the repeater chain;
    the third repeater configured to broadcast the donor base station ID and the repeater chain base station ID;
    the communication server system configured to receive a location request for a User Equipment (UE) and to establish data connectivity between the UE and the PDE over the donor base station and the repeater chain; and
    wherein the UE is configured to transfer the repeater chain base station ID to the location controller, and the location controller is configured to translate the repeater chain base station ID to the repeater chain location and to transfer the repeater chain location.

12. The wireless communication network of claim 11 wherein the donor base station ID comprises a pseudo-random number pilot signal.

13. The wireless communication network of claim 11 wherein the repeater chain base station ID comprises a pseudo-random number pilot signal.

14. The wireless communication network of claim 11 wherein the donor base station ID comprises a first pseudo-random number pilot signal and the repeater chain base station ID comprises a second pseudo-random number pilot signal that shares code space with the first pseudo-random number pilot signal.

15. The wireless communication network of claim 11 wherein the repeater chain location comprises a geographic centroid of a geographic area occupied by the repeater chain.

16. The wireless communication network of claim 11 wherein the repeater chain location comprises a geographic location of one of the repeaters in a center of the repeater chain.

17. The wireless communication network of claim 11 wherein the location controller comprises a Position Determination Entity (PDE).

18. The wireless communication network of claim 11 wherein the location controller comprises an enhanced Serving Mobile Location Center (eSMLC).

19. The wireless communication network of claim 11 wherein the communication server system comprises an Internet Protocol (IP) Multimedia Subsystem (IMS).

20. The wireless communication network of claim 11 wherein the communication server system comprises a Mobility Management Entity (MME).

* * * * *